United States Patent [19]

Posner

[11] 4,277,267
[45] Jul. 7, 1981

[54] AIR FILTER ASSEMBLY

[75] Inventor: Howard L. Posner, Highland Park, Ill.

[73] Assignee: Perfect Filter Corporation, Northbrook, Ill. ; a part interest

[21] Appl. No.: 104,543

[22] Filed: Dec. 17, 1979

[51] Int. Cl.³ .............................................. B01D 46/10
[52] U.S. Cl. .............................. 55/494; 55/DIG. 31
[58] Field of Search .......... 55/494, 495, 511, DIG. 31, 55/515, 503, 509, 514; 206/518; 248/346, 346.1; 210/459, 445, 446

[56] References Cited

U.S. PATENT DOCUMENTS

| | | | |
|---|---|---|---|
| 2,776,772 | 1/1957 | Itoda | 248/346.1 |
| 3,017,698 | 1/1962 | Hambrecht et al. | 55/DIG. 31 |
| 3,154,393 | 10/1964 | Klein et al. | 55/514 |
| 3,185,371 | 5/1965 | Reifers | 206/518 |
| 3,233,812 | 2/1966 | Kennedy | 206/518 |
| 3,830,045 | 8/1974 | Copenhefer | 55/511 |
| 3,970,440 | 7/1976 | Copenhefer et al. | 55/DIG. 31 |
| 4,171,209 | 10/1979 | Brown | 55/466 |
| 4,175,936 | 11/1979 | Lough et al. | 55/511 |
| 4,183,491 | 1/1980 | Sanders et al. | 248/346 |

FOREIGN PATENT DOCUMENTS 2720364 12/1978 Fed. Rep. of Germany ........... 206/518
226364 12/1924 United Kingdom ...................... 55/494

Primary Examiner—David L. Lacey
Attorney, Agent, or Firm—Kinzer, Plyer, Dorn & McEachran

[57] ABSTRACT

An air filter assembly including a molded rectangular frame. The frame includes a filter element supporting and backing portion and an integral peripheral flange portion. The filter element supporting and backing portion is generally planar and is formed with a multitude of discrete circular apertures arranged in a pattern to permit air flow therethrough. The flange portion has a channel shaped cross section defined by inner, outer and connecting walls. The inner and outer walls slope towards each other to permit one rectangular frame to be nested inside another. The outer wall of the flange is shorter than the inner wall and legs are formed as part of the outer wall with the legs being longer than the outer wall but somewhat shorter than the inner wall. The frame is preferably molded from reprocessed paper pulp. The frame is bowed a slight amount longitudinally in the direction of normal air flow through the filter element.

4 Claims, 3 Drawing Figures

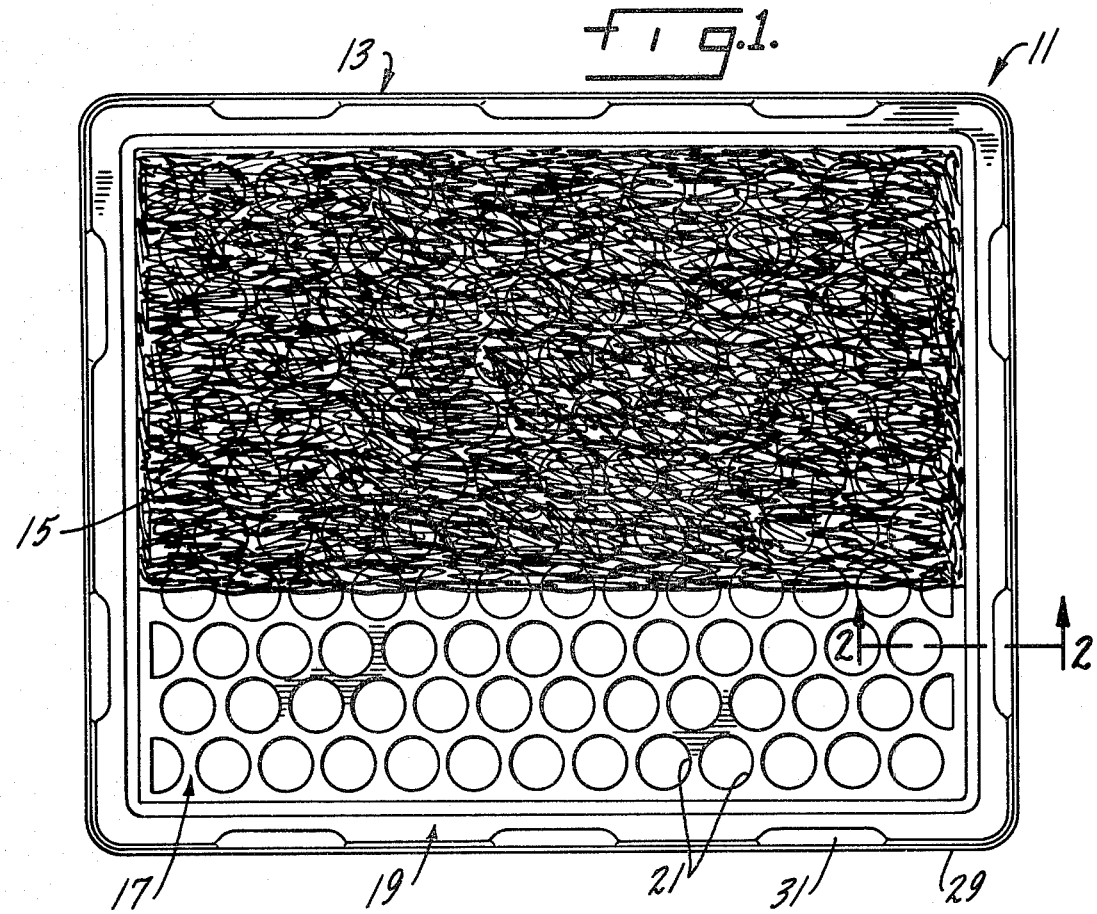
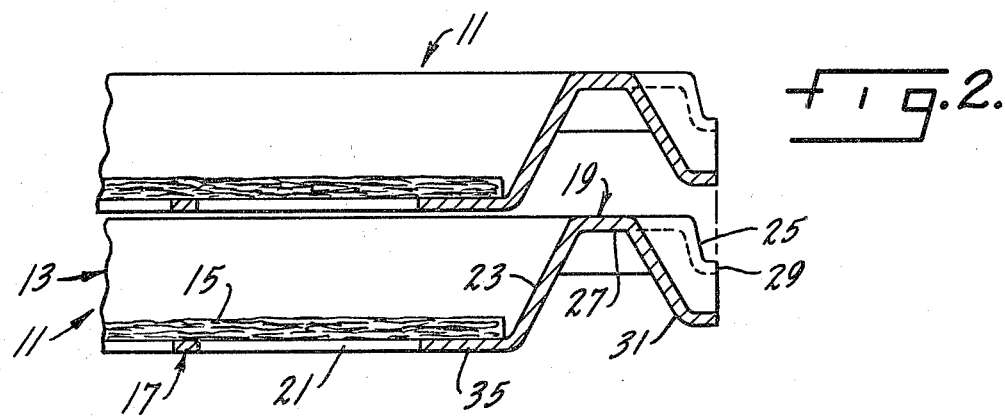
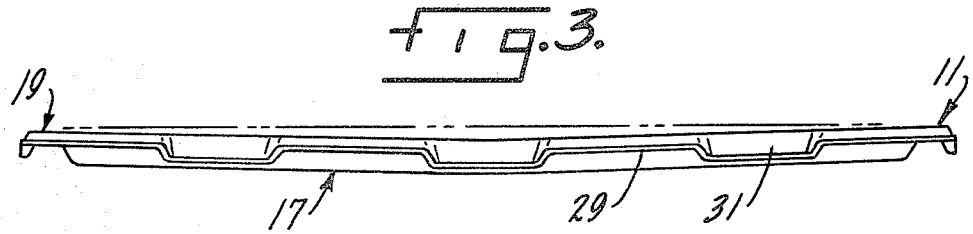

AIR FILTER ASSEMBLY

BACKGROUND AND SUMMARY OF THE INVENTION

Filter assemblies for air conditioning and heating equipment have conventionally been formed of a core of glass fibers bound together by small particles of resinous binders. The glass fibers were usually coated with a thin film of a viscous non-volatile oil to capture particles from the air moving through the fibers. The glass fiber core of such a filter assembly is installed in a thin rectangular paperboard box. The box has opposite walls which are perforated to allow air to flow through the glass fiber core. Although commercially successful, such a filter assembly is not nestable or stackable due to its box-like structure. This structure presents problems in storage and shipment of such filter assemblies because even though the package units are light in weight, their volume makes them expensive to ship where shipping costs are based on volume as well as weight. Also, their volume makes storage costs expensive.

Filter assemblies that can be nested and stacked are shown in U.S. Pat. Nos. 3,830,045 and 3,970,440. These filter assemblies utilize a frame formed of a cut and scored blank of paperboard. When assembled, the paperboard blank forms planar frame members which engage a substantially sheet form filter element. The frame members are flared outwardly to permit the frames to be nested inside one another. Commercially available filters made in accordance with the teachings of these patents are nestable but these filters lack rigidity and strength.

This invention is directed to an easily manufactured filter frame and filter assembly which can be stacked and nested to conserve space and which is sufficiently rigid to function without excessive vibration or breakage.

An object of this invention is a frame for a filter assembly that can be molded in a single integral piece.

Another object is a filter assembly frame that can be manufactured from readily available and inexpensive material, specifically reprocessed paper pulp.

Another object is a filter assembly that uses less filter media than similar sized filter assemblies formed of cut and folded paperboard or cardboard box structures.

Other objects will be found in the following specification, claims and drawings.

BRIEF DESCRIPTION OF THE DRAWINGS

The invention is illustrated more or less diagrammatically in the following drawings wherein:

FIG. 1 is a top plan view of a filter assembly of this invention with a portion of the filter element broken away for clarity of illustration;

FIG. 2 is a cross sectional view taken along line 2—2 of the filter assembly of FIG. 1 and showing one filter assembly about to be nested on another filter assembly; and FIG. 3 is an end view of the filter assembly of this invention.

DESCRIPTION OF THE PREFERRED EMBODIMENT

FIG. 1 of the invention shows an air filter assembly 11 of this invention which includes a molded rectangular frame 13 and a filter element 15.

The rectangular frame 13 is molded in one piece, 70 to 90 mils thick, preferably of reprocessed paper pulp, although it should be understood and appreciated that the frame may be molded of any conventional plastic material. The frame includes a filter element supporting and backing portion 17 and a integrally formed flange portion 19 which surrounds the portion 17. A plurality of large circular discrete apertures 21 are formed in the backing portion 17 and are usually arranged in a pattern providing maximum air flow commensurate with adequate strength.

The flange portion consists of four sections, one on each side of the filter element supporting and backing portion with each section having a channel shaped cross section defined by an inner wall 23, an outer wall 25 and a connecting wall 27. The inner and outer walls slope towards each other. The connecting wall extends generally parallel to the filter element supporting and backing portion 17. The outer wall 25 is shorter than the inner wall 23 and ends in an outwardly extending peripheral rim 29. Legs 31 are formed in the outer wall and are recessed somewhat inwardly of the outer wall. These legs extend below the peripheral rim 29 of the outer wall and terminate short of the plane of the filter element support and backing portion 17. The inner and outer walls and legs 31 slope in a converging direction from the filter element supporting and backing portion 17 to permit one filter assembly to be nested inside the other.

The filter element 15 may be made of polyester fiber formed in a thin sheet or layer. The fiber sheet is dropped onto the frame and stapled or heat sealed to the shoulder portion 35 of the backing portion 17 which shoulder is located between the aperture and the flange. Heat sealing can be accomplished by adding vinyl to the fibers and frame and heating this material dielectrically or thermally.

The molded rectangular frame is bowed longitudinally in the direction of air flow to pre-stress the structure as is shown in FIG. 3 of the drawings. As is conventional (for example, as shown in U.S. Pat. Nos. 3,830,045 and 3,970,440), the filter element 15 is located on the air inlet side or upstream side of the filter assembly, in other words, the side facing the viewer in FIG. 1 of the drawings. When it is installed in a conventional supporting frame in a heating or air conditioning unit it will be straightened to hold firmly in place. Approximately a quarter of an inch of bowing is used on a filter assembly approximately three quarters of an inch thick. The phantom line in FIG. 3 is used to indicate the relative amount of bowing that is provided with the filter assembly being bowed in the direction of air flow through the filter assembly.

I claim:

1. An air filter assembly including,
   a molded rectangular frame having a filter element supporting and backing portion and an integral peripheral flange portion,
   the filter element supporting and backing portion being generally planar and having a plurality of discrete apertures formed therein in a pattern to permit air flow therethrough,
   the flange portion having a channel shaped cross-section defined by an inner, an outer and connecting walls with the inner wall attached to the filter element supporting and backing portion,
   the inner and outer walls of the flange portion sloping towards each other in the direction away from the filter element supporting and backing portion so that one frame can be nested in another, and a filter element mounted on and attached to the filter element supporting and backing portion on the flange portion side of the frame.

2. The air filter assembly of claim 1 in which the outer wall of the flange portion is shorter than the inner wall.

3. The air filter assembly of claim 1 in which the frame is molded from paper pulp.

4. The air filter assembly of claim 1 in which the filter element supporting and backing portion and the flange portion are bowed along the longitudinal axis of the filter assembly.